United States Patent [19]
Pyron

[11] Patent Number: 5,966,793
[45] Date of Patent: Oct. 19, 1999

[54] APPARATUS FOR POWERED BAGHOUSE FILTER EXTRACTION

[75] Inventor: Donald R. Pyron, El Dorado, Ark.

[73] Assignee: Idea Specialty Services Inc., El Dorado, Ark.

[21] Appl. No.: 08/792,236

[22] Filed: Jan. 31, 1997

[51] Int. Cl.$^6$ .................................................. B23P 19/04
[52] U.S. Cl. ............................................................ 29/252
[58] Field of Search ............................ 29/252, 259, 261, 29/239; 254/93 R, 18

[56] References Cited

U.S. PATENT DOCUMENTS

| | | | |
|---|---|---|---|
| 1,036,748 | 8/1912 | Tobey | 29/259 |
| 1,598,887 | 9/1926 | Smith | 29/262 |
| 3,069,761 | 12/1962 | Sommer | 29/252 |
| 3,689,978 | 9/1972 | Kelso | 29/259 |
| 3,908,258 | 9/1975 | Barty | 29/259 |
| 5,233,740 | 8/1993 | Chen | 29/252 |
| 5,704,591 | 1/1998 | Byrne | 254/18 |

*Primary Examiner*—Robert C. Watson
*Attorney, Agent, or Firm*—Stephen D. Carver

[57] ABSTRACT

Portable cylinder-powered tools and related power extraction methods for removing filter bags during baghouse filter servicing. The preferred tools comprise elongated, pneumatic cylinders provided with handles for easy grasping. Control valves emanating from a manifold activate the cylinder. A rigid extractor and a companion foot extend downwardly from the cylinder. The extractor terminates in a wedge-like prong that penetrates the tubesheet orifice and engages a baghouse filter. In a first embodiment the extractor is fixed and the foot is ram driven. A second tool directly controls the extractor with the cylinder ram, and the foot is fixed to the cylinder to brace the tool when the extractor is forcibly retracted. The extractor barb first deforms and then captivates the filter. The ram forces the extractor and the prong upwardly, and the bag filter is forcibly dragged out of the tubesheet orifice. The methods described herein effect the power removal of baghouse filters with extractor prong arrangements of the character described.

12 Claims, 8 Drawing Sheets

Prior Art

APPARATUS FOR POWERED BAGHOUSE FILTER EXTRACTION

BACKGROUND OF THE INVENTION

1. Field of the Invention

The present invention relates generally to apparatus and methods for servicing baghouse filters. More particularly, my invention relates to a method and a power tool for automatically extracting filter bags from baghouse tubesheets when such baghouse filtering systems are routinely serviced.

2. Description of the Prior Art

As will be recognized by those skilled in the art, a variety of baghouses are employed to filter particulates entrained in exhaust gases expelled from various commercial processes. Typical baghouses include a large enclosure having an upper gas output compartment separated from a lower gas intake compartment by a generally planar tube sheet. The rigid, usually steel tube sheet includes a plurality of orifices for receiving multiple bag air filters. The bag air filters collectively filter gases drawn from the lower compartment. The filters may comprise cartridge filters, or snap band pulse jet dust collectors. Typically these individual baghouse filters are elongated and generally tubular. An interior, generally tubular cage provides a supporting skeleton. The cage framework is surrounded by suitable fabric that provides the filtering media. The upper end of the fabric may be folded about the periphery of a mounting header that aids in suspending the bag from the tube sheet.

Typical snap band pulse jet dust collectors include a resilient band that circumscribes their diameter. The somewhat flexible band has a central, circumferential channel that is deformed somewhat during installation within a suitable tube sheet mounting orifice. As the filter is pushed into the tubesheet orifice and properly positioned, the snap band firmly seats within the orifice. In other words the band "snaps back" to flushly lock itself within the mounting orifice to seal the leak path that might otherwise occur. The cage and the fabric body drop downwardly into the air intake compartment, firmly suspended from the tubesheet by the header. In operation, gases pass through the fabric filter media, and they exit the header into the upper baghouse compartment, usually through a metallic venturi coaxial with the header.

Dust, particulate matter, and accumulated oils and residue collect on the baghouse filters, eventually degrading or interrupting gas flow. Baghouses (and their filters) must therefore be serviced regularly. Maintenance requirements are dependent upon a number of variables, including the type and volume of effluent being filtered, the nature of the particulates and chemicals borne by the air stream, the capacity of the baghouse, and the duration of operation. Some baghouses are "self cleaning." The latter systems employ blow tubes that periodically pulse the bag filters with high pressure air. Bursts of air impinging upon the bag filters partially dislodge accumulated dust and debris, which may exit the bottom of the baghouse. However, automatic self-cleaners cannot remove all of the residue that accumulates on the filter bags. As a result the bags must be periodically changed. A typical work crew uses a haphazard variety of tools for this purpose, and the process is slow and labor intensive.

For example, it is not unusual for a team of workman to employ various wedges, pry bars and other typical hand tools when changing filters. The lack of customized tools for the process contributes to the labor intensive quality of the operation. By way of example, six workman can usually remove approximately eighteen hundred individual filters after twelve to sixteen hours of manual labor. Another problem is baghouse filter damage. When conventional tools or processes are utilized to remove baghouse filters, the cages are often bent or ruined. Sometimes the bag filters are rendered completely unusable during extraction. On the other hand, if only minor damage has occurred, the baghouse filters may be serviced and rebuilt according to the teachings, for example, of U.S. Pat. No. 5,398,386 for which I was a coinventor.

Thus, there is a need for removing baghouse filters in a quick and efficient manner. Such a system should minimize manual labor and should enable a smaller team of workers to much more rapidly extract the baghouse filters. A preferred system should be cost efficient. I have found by experiment that normal labor times associated with conventional baghouse servicing can be cut by more than half with the tools or methods of my invention.

SUMMARY OF THE INVENTION

I have developed portable power tools and related streamlined methods for servicing baghouses.

According to the invention, the preferred tools comprise an elongated, rigid frame that may easily be grasped by a workman for movement over the baghouse tubesheet region being serviced. Preferably the frame comprises a power cylinder. Appropriate control valves are associated with a control manifold at the top of the cylinder. Suitable handles near the manifold provide a grip to the user.

A rigid extractor and a cooperating foot extend downwardly from the cylinder. The extractor penetrates the tubesheet orifice to remove a baghouse filter. In the first embodiment the extractor is fixed to the cylinder bottom, and a cooperating foot is driven by the cylinder ram. In the second design the extractor is directly extended or retracted by the ram, and the foot is secured to the cylinder bottom to provide a brace. A single action pneumatic cylinder is preferred in the first embodiment, and a double action pneumatic cylinder is preferred for the second.

The extractor is mounted at the cylinder side in the first embodiment. A downwardly extending extractor bar mounts a wedge-like extractor prong whose leg is adjustably secured to the bar. A pair of slots permit adjustments to length. The extractor prong terminates in a rigid, pointed barb. The extractor point is forced between the periphery of a bag filter to be removed and the periphery of its tubesheet mounting orifice. As the extractor wedges downwardly, the extractor barb will first bend and then captivate the filter snap ring like a fish hook. When the extractor is withdrawn the prong will move upwardly and the bag filter will be forcibly removed.

In the best mode the ram-driven foot slams against the tubesheet to pull out the extractor. It is activated by cylinder pressure after the workman manually triggers a suitable valve. With the second tool a cylinder power stroke can first force the extractor into engagement with the filter. Then the cylinder can be reversed to forcibly withdraw the extractor as the ram retracts. The methods described herein involve steps related to the power removal of baghouse filters.

Thus a basic object is to provide a power tool and a powered method for servicing baghouse filters.

A fundamental object is to provide both a method and a versatile power tool for quickly and nondestructively removing bag house filters.

Another primary object of my invention is to provide a power tool for efficiently removing snap band filter bags and cartridge filter bags from baghouse filter systems.

An important related object is to provide a method for quickly and efficiently servicing baghouse filter systems.

Another primary object of my invention is to provide a portable power tool for servicing snap band bag filters and cartridge bag filters used in baghouses.

A related object is to provide a tool and a method of the character described that forcibly but nondestructively removes snap band filters and cartridge filters from baghouse tubesheets.

Another important object is to salvage the baghouse filter cages that might otherwise be destroyed or damaged with conventional baghouse filter servicing or cleaning techniques.

A still further object is to provide a streamlined process for servicing baghouses, and for maintenancing or repairing baghouse filters.

Yet another object is to reduce job-related employee injuries that often occur when known prior art baghouse filter servicing techniques are employed.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figures 1, 2:
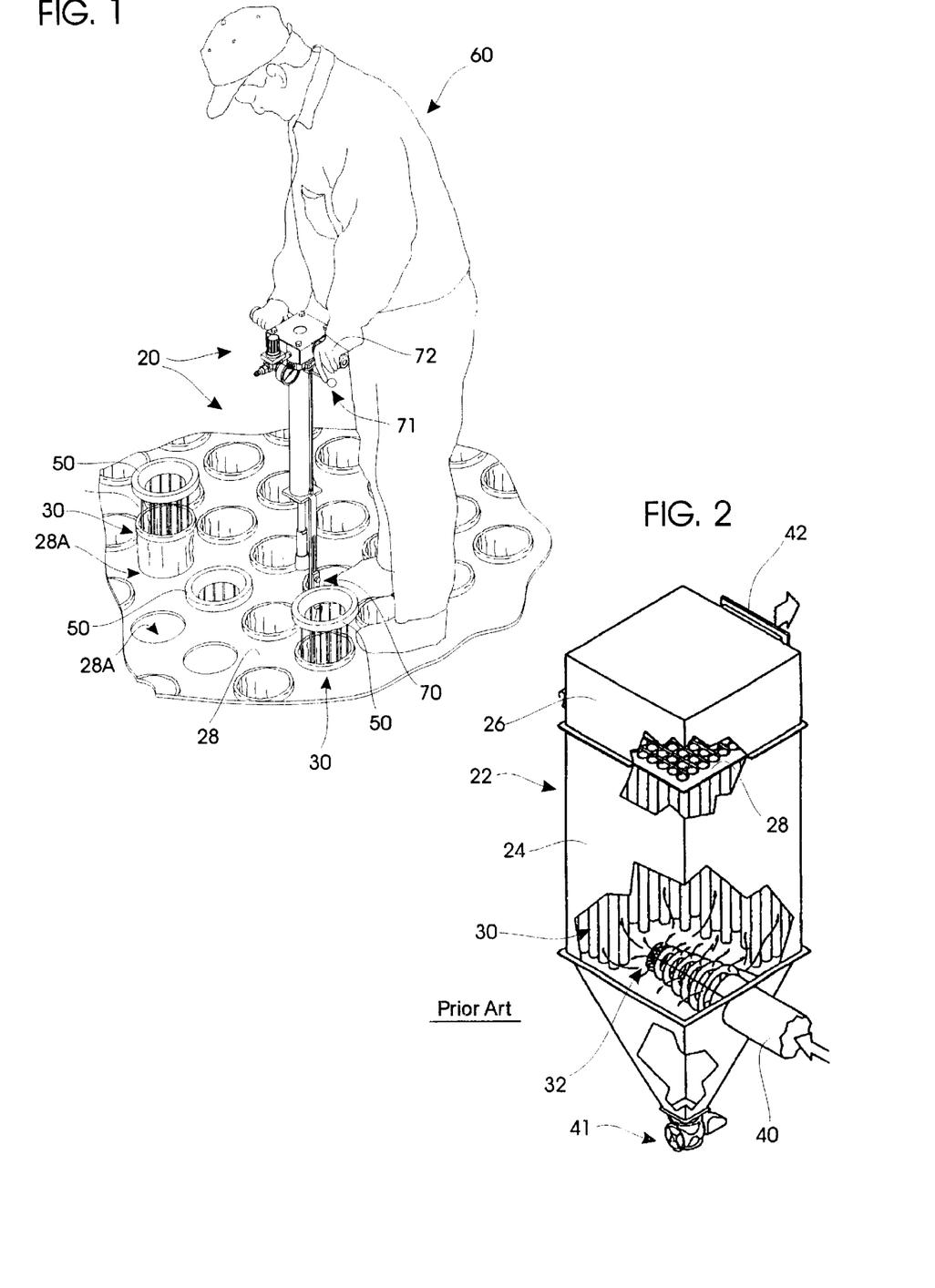
FIG. 1 is a fragmentary, pictorial view of a baghouse illustrating the preferred method and tool.
FIG. 2 is a fragmentary, perspective view of a conventional baghouse.
Figure 3:
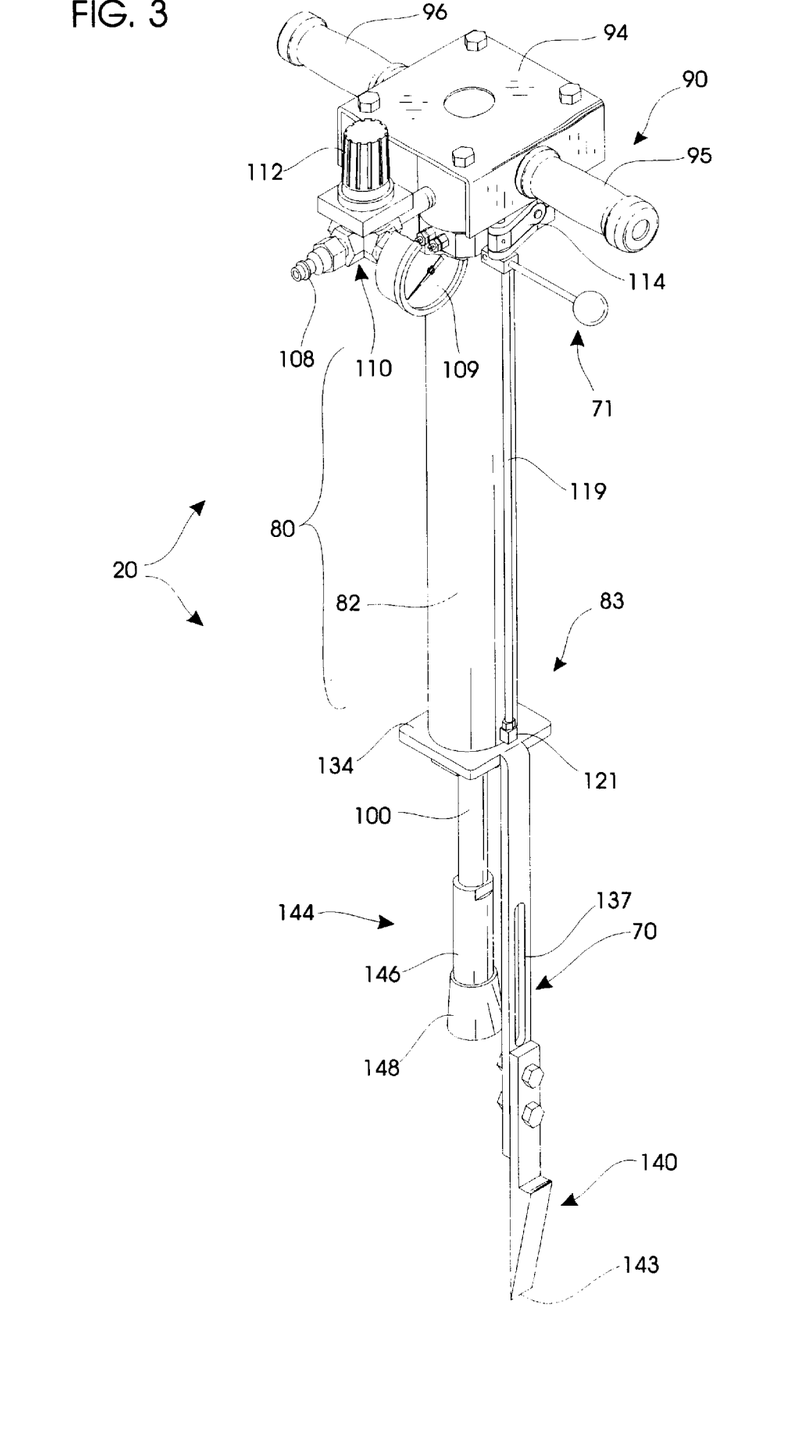
FIG. 3 is an enlarged isometric view of the best mode of my new tool.
Figure 4:
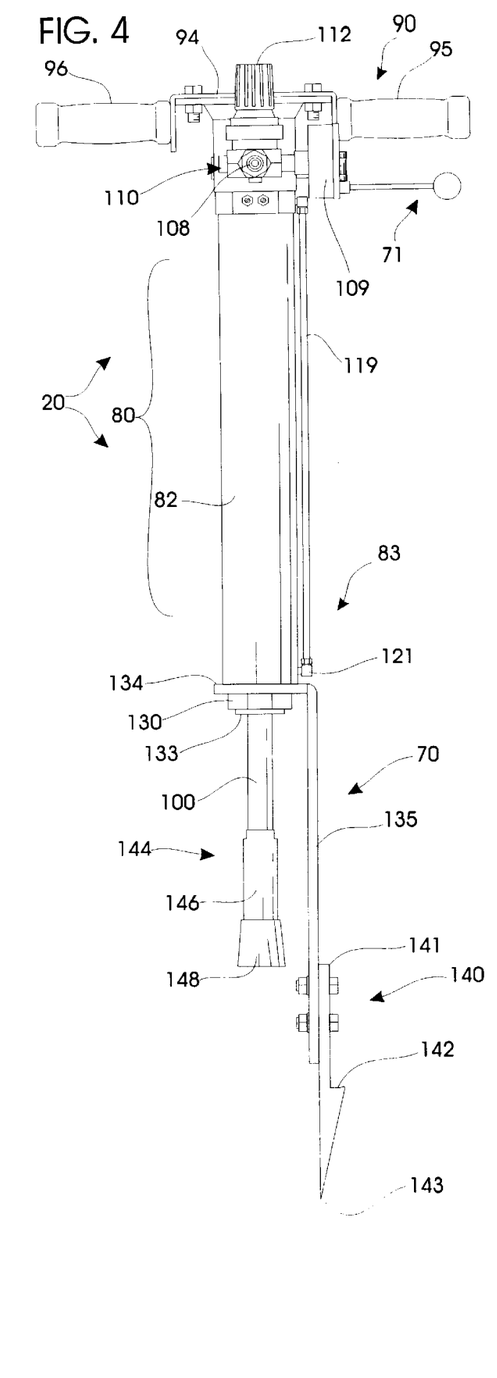
FIG. 4 is a front elevational view of the preferred tool.
Figure 5:
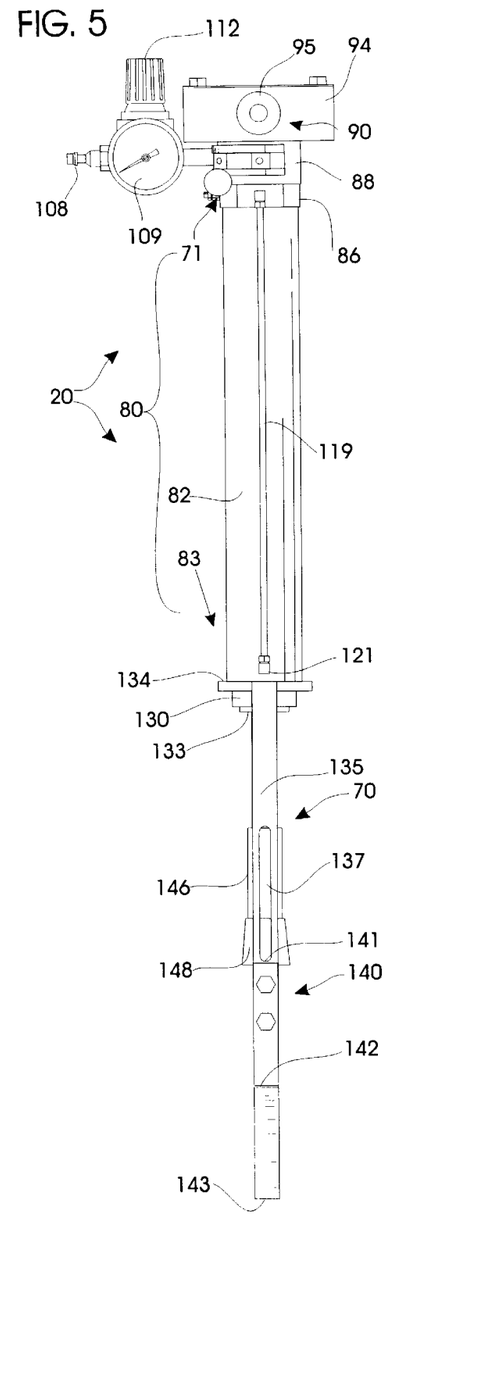
FIG. 5 is a right side elevational view thereof, taken from a position generally to the right of FIG. 4.
Figure 6:
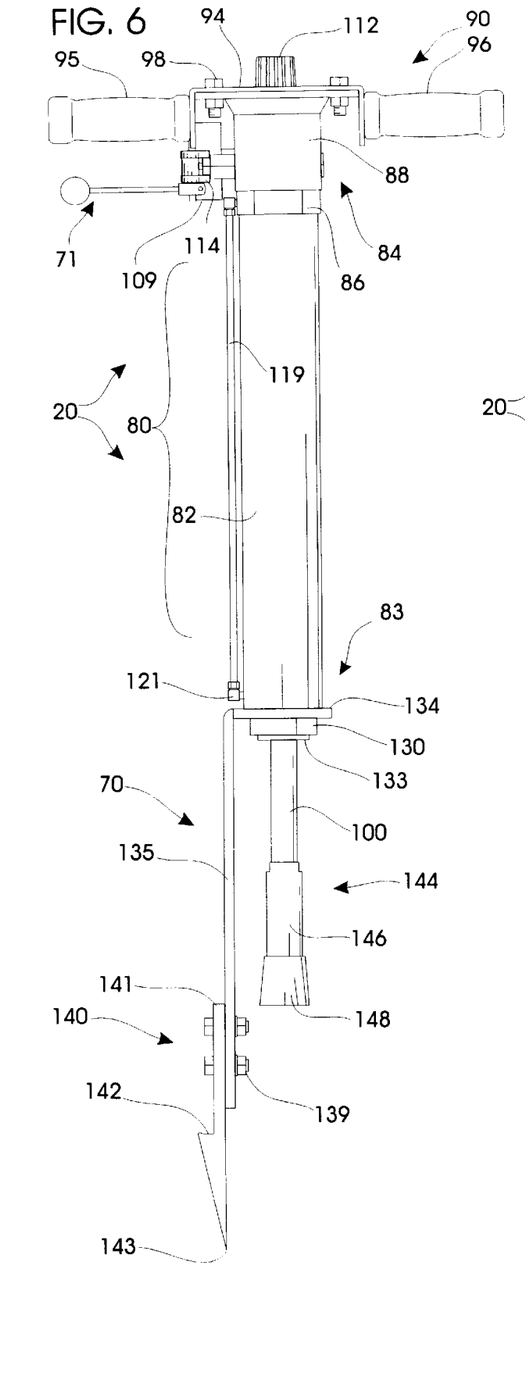
FIG. 6 is a rear elevational view of the preferred tool, taken generally from a position behind FIG. 4.
Figure 7:
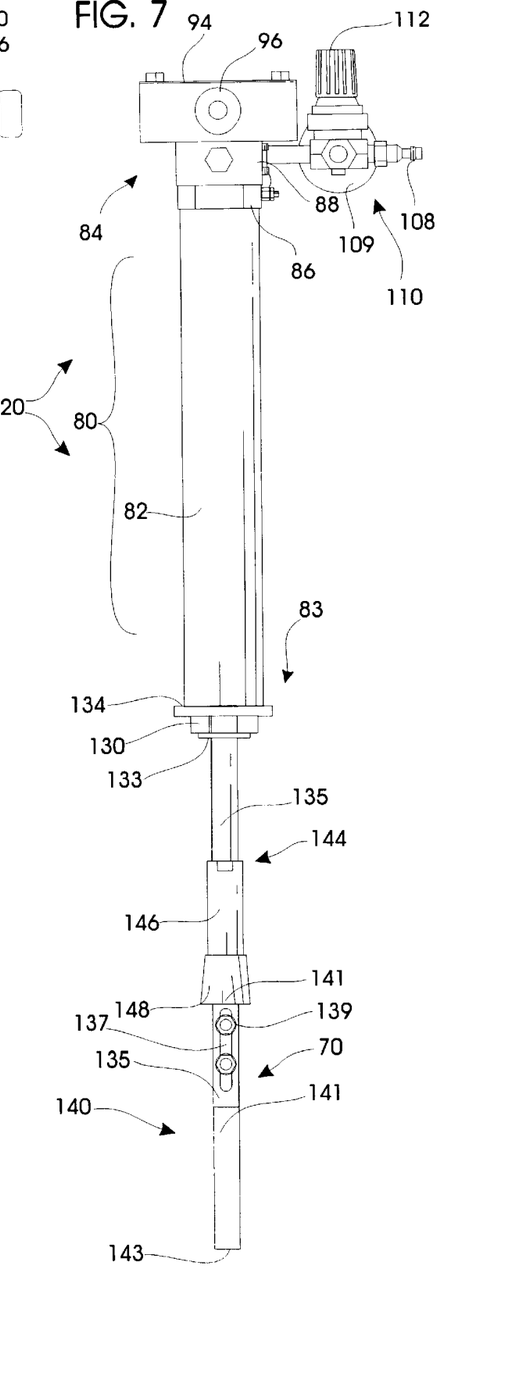
FIG. 7 is a left side elevational view of the tool taken generally from the right of FIG. 6.
Figure 8:
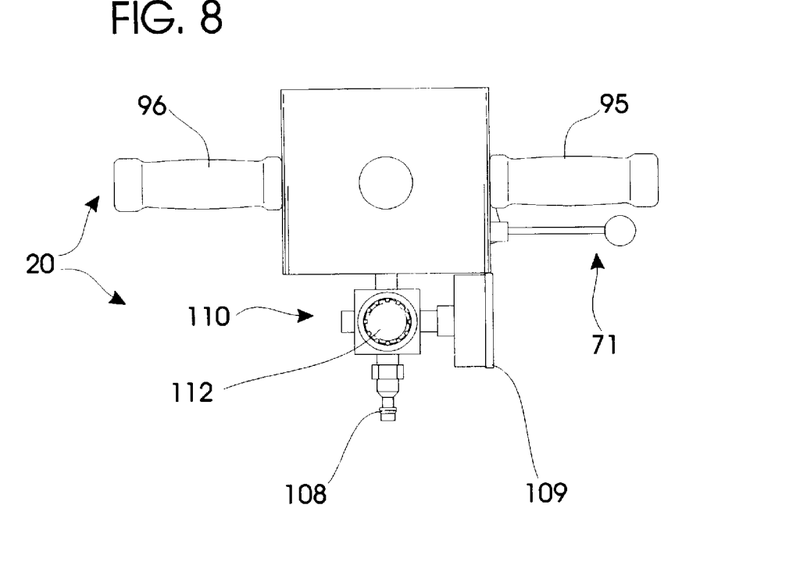
FIG. 8 is a top plan view of the preferred tool.
Figure 9:
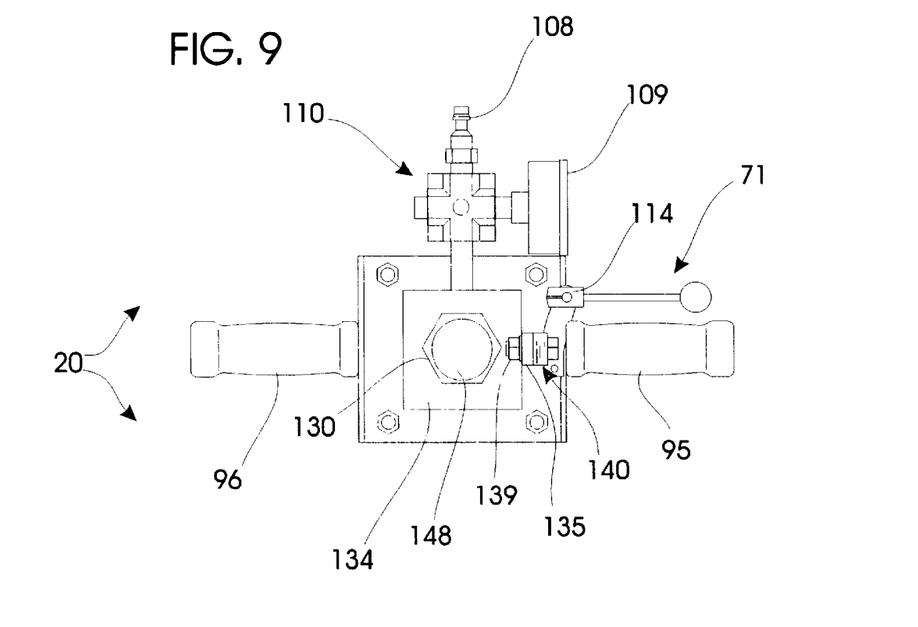
FIG. 9 is a bottom plan view of the preferred tool.

With initial reference directed to FIGS. 1 and 2 of the appended drawings, a tool constructed in accordance with the best mode of this invention has been generally designated with the reference numeral 20. The tools and methods of the present invention have been developed for servicing conventional filter baghouses that may assume a variety of configurations, volumes and shapes.

A typical baghouse 22 (FIG. 2) comprises a generally cubical enclosure 24 having a top 26 separated from the lower enclosure 24 by an intermediate tube sheet 28. The tubesheet 28 comprises a plurality of orifices 28A (FIGS. 1, 14, 15) which receive and mount bag filters 30. The planar tubesheet 28 acts as a divider between adjacent compartments, and it supports the weight of the workmen 60 during servicing. Typical, elongated bag filters 30 are suspended from the tubesheet 28, extending downwardly within interior 32 of the baghouse lower compartment. Gases entering through conduit 40 pass through the various bag filters 30, and reach the interior of top 26. Heavy particulate matter entering the dust chamber can drop downwardly from baghouse 22 through output 41. Substantially filtered and cleaned gases discharge through an outlet vent 42. Periodically, accumulated debris and residue clogs the bag filters, necessitating removal and replacement.

As recognized by those skilled in the art, each individual bag filter comprises a generally tubular cage 49 (FIGS. 10–15). The cage provides a supporting skeleton for the fabric filter material 58 supported by it that comprises the outer body of the bag filter. The upper portion of the cage is fitted with a mounting header 50 having a peripheral flange 55. An exhaust venturi (not shown ) may be coaxially mounted in this region. The upper portion of each bag filter includes an encircling snap band 54 made of resilient material. The snap band has a central, recessed grove 56 enabling it to be fitted within one of the tubesheet orifices 28A (FIG. 1) in the tubesheet 28. When the filters are snap fitted to the tubesheet, they snugly seal the tubesheet orifices. The header flange 55 encircles the snap band and rests upon the tubesheet for support. Periodically the filter bags must be removed, and ordinarily this is done with manual tools as explained earlier. My power tools 20, 20A (FIG. 16) forcibly and non-destructively remove the bag filters 30

Accordingly, tool 20 may be grasped by a workman 60 (FIG. 1) and moved within the baghouse region 26 during cleaning. The extractor, generally designated by the reference numeral 70, penetrates the tubesheet orifices between the orifice perimeters and the edges of the bag filter (FIGS. 14, 15) and captivates or engages sides of bag filter. When the cylinder is activated by triggering valve 71 with hands 72, the apparatus forcibly withdraws the tube filter for immediate replacement or repair.

With joint reference now to FIGS. 1 through 7, tool 20 preferably comprises an elongated frame generally designated by the reference numeral 80. In use, the tool and the frame are somewhat vertically oriented over the tubesheet 28. Frame 80 in its best mode comprises a power cylinder. Preferably the cylinder is a single action pneumatic cylinder. A double acting pneumatic cylinder is preferred with tool 20 where the customer demands powered reset of the ram driven foot to be described later.

The preferably pneumatic cylinder 82 comprises a bottom 83 and a top generally designated by the reference numeral 84. The top 84 comprises a collar nut 86 beneath a control manifold 88 that mounts the handle assembly 90. Although a pneumatic cylinder is preferred, it will be appreciated that a hydraulic cylinder could be used in certain circumstances, or various forms of electric plungers or linear actuators can be used.

Preferably, handle assembly 90 comprises an inverted, U-shaped bracket 94 traversing the control manifold 88. The bracket mounts individual handles 95, 96 for grasping with the hand 72 of the workman 60. Conventional fasteners mount the handle.

Preferably cylinder 80 mounts the extractor 70 previously discussed. Cylinder 80 controls the piston-driven ram 100 that is extended by high pressure air. Cylinder 80 may comprise a single action pneumatic cylinder, in which case an internal spring (not shown) retracts the ram after actuation (and depressurization). Alternatively a double action cylinder may be employed, and the same is preferred with tool 20A to be discussed hereinafter. Air is inputted through a nipple fitting 108 to a regulator 110 into the control block 88. A conventional pressure indicator gauge 109 is associated with a regulator 110. The pressure setting may be varied with control knob 112. Air flow is directed with the valve 114 controlled by the handle 71. An elongated pressure return tube 119 extends from control valve 114 to an elbow 121 at the bottom 83 of cylinder 80. Thus, with a source of HP air connected to nipple 108, the tool 20 will be ready for action.

In tool 20 the extractor 70 is mounted at the cylinder side. The bottom jam nut 130 surmounts threaded shaft 133 and captivates a flange 134 between it and the body of cylinder 80. Flange 134 is integral with a rigid, downwardly projecting extractor bar 135 forming part of the extractor 70. The extractor bar 135 mounts a web-shaped extractor prong 140 whose leg 141 is secured to bar 135 by fasteners 139. A pair of elongated adjustment slots 137 (FIG. 7) are formed in bar 135 to enable positional adjustment of prong 140. Extractor prong 140 includes a barbed 11 portion 142 tapering to a point 143. In use, extractor point 143 is first directed and wedged between the tubesheet orifice 28A and the periphery of the snap ring portion 54 of the filter being removed. As the extractor prong is forced downwardly, the snap ring will resiliently deform over the barb 142, and the tube filter will be captivated. When the extractor is withdrawn (i.e., prong 140 is drawn upwardly with respect to tubesheet 28) the filter 30 will be forcibly removed.

Tool 20, in the best mode, employs a ram-driven foot 144 to forcibly contact the surface of tubesheet 28 in response to the cylinder. Foot 144 is extended by ram 100 into contact with the tubesheet 28. Its motion moves the tool upwardly, pulling the extractor 70 out of the tubesheet. A shaft 146 is preferably threadably secured to the ram 100 so that the relative length of the foot 144 may be varied. Preferably shaft 146 terminates in a resilient end cap 148 that frictionally engages the tube sheet surface.

Figure 10:
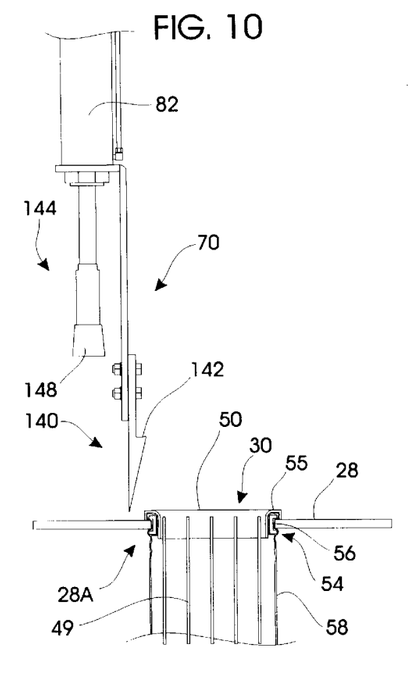
FIGS. 10–14 are fragmentary, side elevational views illustrating the preferred method.
Figure 11:
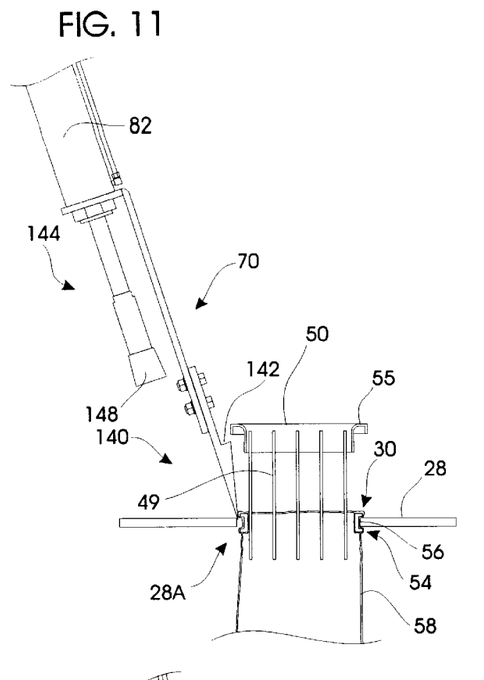
Figure 12:
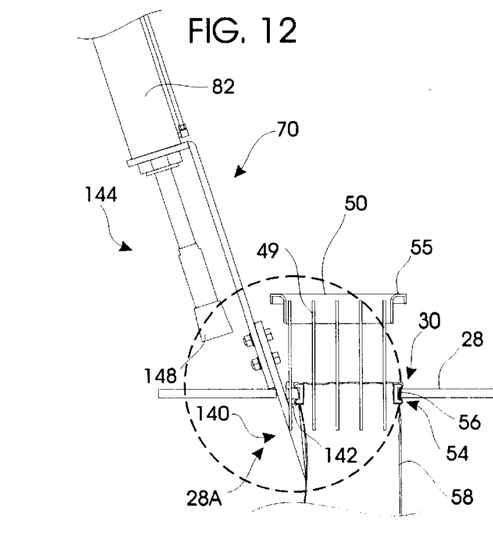
Figure 13:
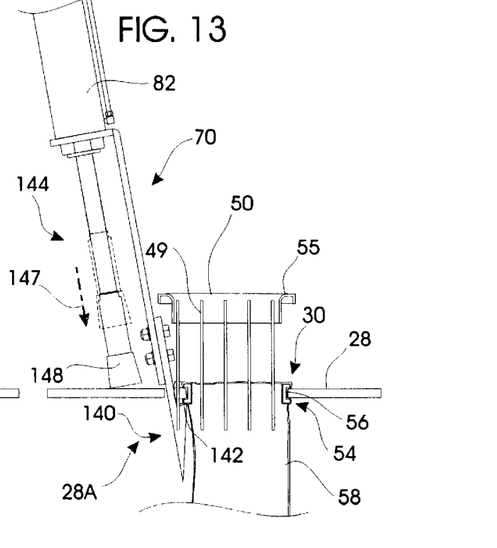
Figure 14:
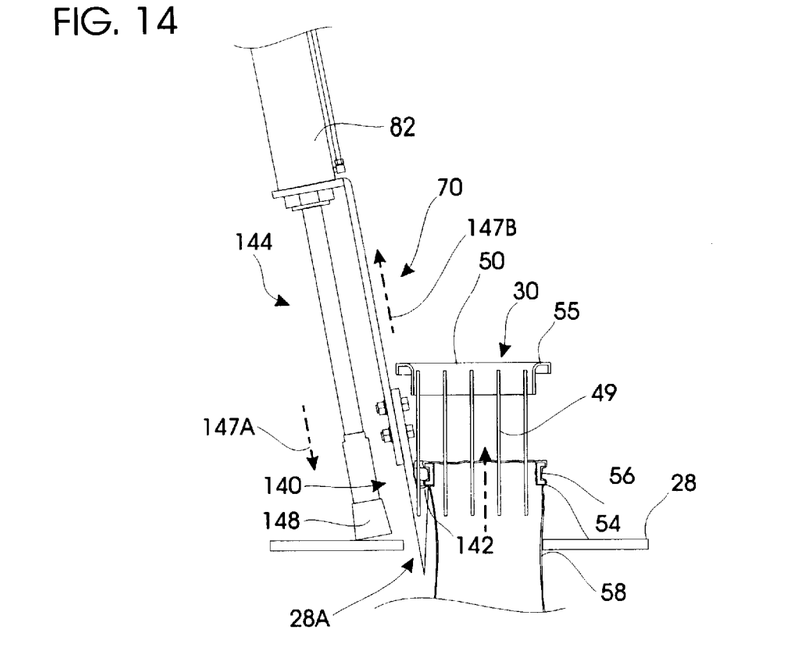
Figure 15:
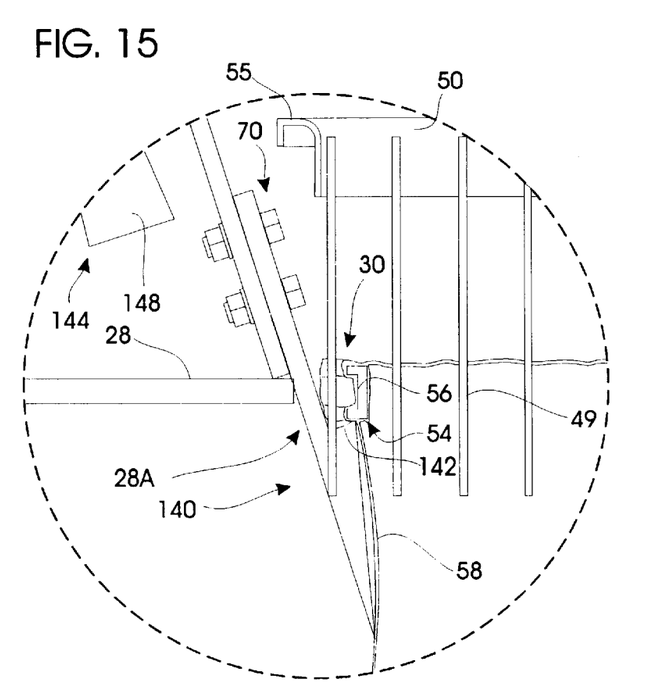
FIG. 15 is an enlargement of the region circled in dashed lines in FIG. 12; and, FIG. 16 is a front elevational view of an alternative mode of the tool.

At the start, the tool 20 is positioned as in FIG. 10. The extractor prong may be used to deflect the header 50 and the cage away from the snap ring, as in FIG. 11. The extractor is pushed downwardly against yieldable pressure from the snap ring against the wedge shaped prong. It is forced downwardly until the prong 142 is beneath the resilient snap ring 54, as in FIG. 12. When cylinder 80 is activated, the foot 144 rapidly moves downwardly and strikes the tubesheet 28. The latter motion is indicated by arrow 147 in FIG. 13, and by arrows 147A, 147B in FIG. 14. As the extractor assembly 70 has already captivated the filter bag at this time, the bag is forced upwardly and uninstalled as prong 142 acts like a fish hook. The bag and cage assembly is thus jerked out of the mounting hole 28A as seen in FIG. 14.

The alternative tool, 20A (FIG. 16), reverses the position of the extractor and the foot from that previously described. The foot is fixed, and the extractor is piston operated. The lower end 150 of the preferably double acting cylinder 151 includes a jam nut 154 that secures a flange 156 projecting away from the longitudinal axis of the cylinder. The modified foot 160 comprises a shaft 162 threadably coupled to lower portion 164 that terminates in a resilient end cap 166. The length of the foot 160 may be threadably adjusted.

Figure 16:
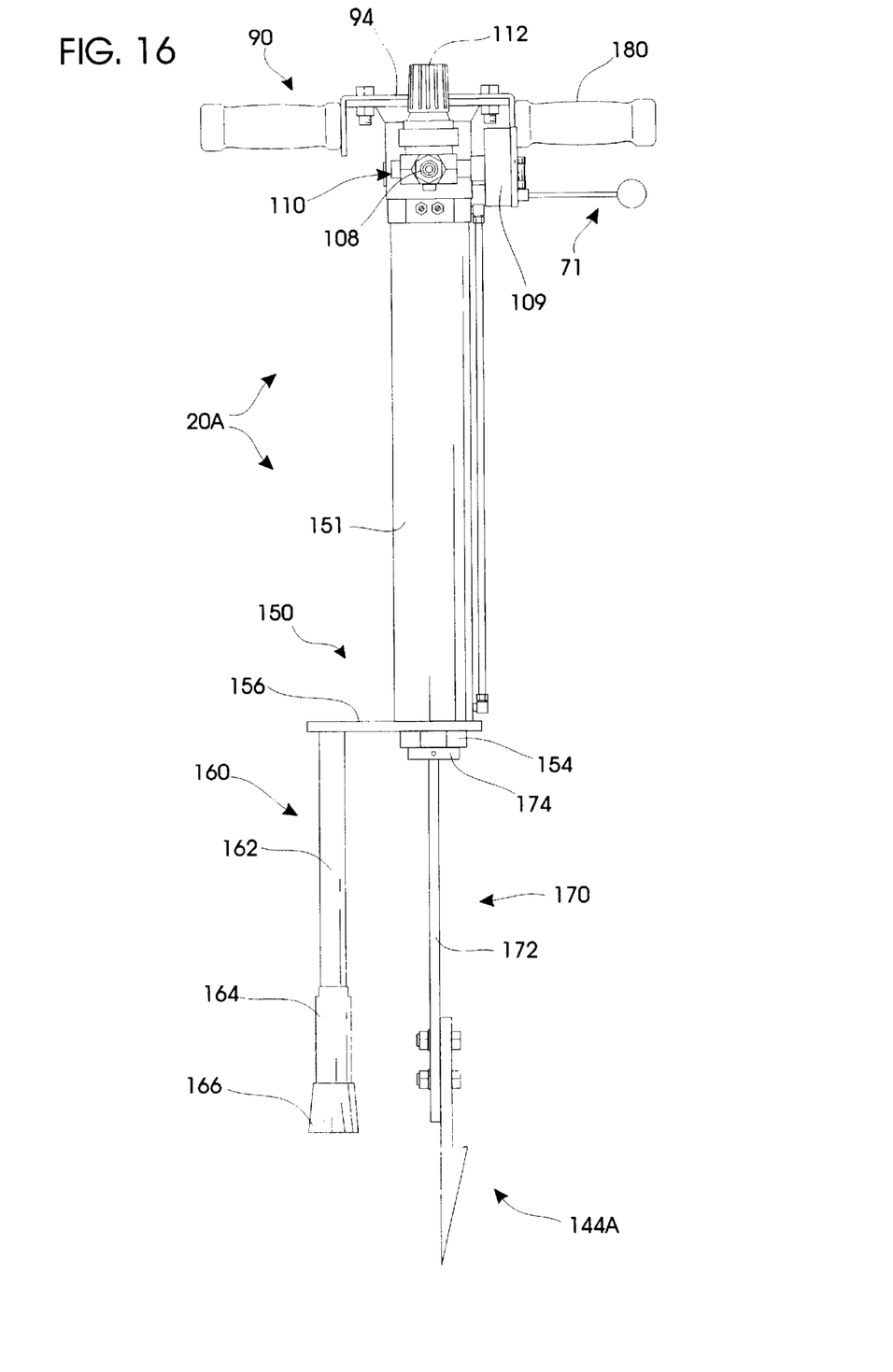

In this instance the extractor 170 includes a body portion 172 secured directly to a collar 174. A barbed prong 144A similar to prong 140 already discussed, is again utilized to extract the filters. However, in this embodiment the prong is forced into the region between the edge of the tubesheet orifice and the snap ring by the double acting cylinder. It may be forced initially into contact by activating handle 71, so that the double acting cylinder 151 can utilize a power stroke to forcibly insert prong 144A. Afterwards, with proper adjustment of the length of foot 160, the operator may simply direct the foot end cap 166 against surface of tube sheet 28. When he reverses the pneumatic cylinder with handle 71, the extractor 170 is retracted forcibly, but the tool is braced by the foot 160. In this manner, the extractor is first inserted with the benefit of a power stroke, and then filters are withdrawn in response to the reverse power stroke.

Operation

To clean a baghouse, the industrial equipment outputting gas on line 40 (FIG. 2) must first deactivated. At this time access to the compartment 26 will be achieved by unbolting suitable inspection plates or by traversing suitable doors which are provided in various systems. The operators will stand upon the tube sheet 28 within the compartment 26 and utilize tools 20, 20A previously described. The tool should be interconnected with a suitable filtered source of HP air by innerconnection with nipple 108 as previously discussed. At this time the valve assembly that controls the double acting power cylinder may be operated by merely finger flipping the switch 71.

With either embodiment, the plunger is controlled by the cylinder. With tool 20, the extractor 70 may first leverdislodge the header 50. The extractor is first forced into the region between the tube sheet to engage the filter. As the extractor is pushed downwardly against yieldable pressure from the outside of the snap band, it will gently deform the snap band so that it will snap back into position against the barb. To generate an upward movement of the extractor, the cylinder must be activated with valve 71 to forcibly extend the foot 144 as in FIG. 13. As foot 144 is thrust against the tube sheet 28, it will quickly deflect the tool 20 upwardly, taking the extractor 70 and the filter to be removed with it.

With tool 20A the procedure is substantially similar. If the cylinder is double acting, the extractor can be powered into the position of FIG. 12. Then when the pneumatic valve is reversed, the extractor will be forcibly withdrawn by the ram, and the tool 20A will be braced against the tubesheet by its foot. When using the alternative tool 20A (FIG. 16), the extractor 170 may be plunged into the tube sheet to make contact with the baghouse filter as before. However, it is preferred that tool 28 provide an optional power stroke to the user, so that the workman may simply trigger valve 71 and force the extractor 170 into engagement. With a bit of manual manipulation thereafter, the foot 160 will be positioned within cap 166 on the tube sheet. The gentle rocking motion necessary to position the apparatus for a comfortable "feel" can best be reached by adjusting the length of the foot as discussed.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable tool for extracting dust collector bag filters in baghouses of the type comprising a plurality of bag filters collectively mounted in a tubesheet, the bag filters having generally circular peripheries and the tubesheet comprising a planar floor and a plurality of spaced apart orifices in said floor in which said filters are mounted, said tool comprising:

an elongated, vertically upright frame adapted to be generally perpendicularly oriented with respect to said baghouse tubesheet, the frame comprising a top;

a handle coupled to said frame at the top thereof for enabling manual manipulation of said tool by a workman;

an extractor extending from said frame for engaging a bag filter to be removed by first penetrating the tubesheet mounting orifice in which said bag filter is mounted adjacent the circular periphery of the filter to be removed, and thereafter captivating a portion of said bag periphery below the plane of the tubesheet floor when said extractor is removed;

a foot projecting downwardly from said frame that forcibly engages the tubesheet floor adjacent a bag filter and the hole in which it is received;

a power a cylinder for forcibly, axially displacing one of said extractor and said foot the other whereby said extractor is forcibly removed from said tubesheet orifice and simultaneously a bag filter is forcibly removed from said tubesheet by said extractor; and, control means mounted proximate said handle selectively activating said power cylinder.

2. The tool as defined in claim 1 wherein said frame comprises a double acting pneumatic power cylinder, and said handle is secured to said cylinder.

3. The tool as defined in claim 1 wherein said extractor comprises a sharp, prong adapted to forcibly penetrate the tubesheet mounting orifice and the bag filter therein, the prong comprising a rigid barb for captivating and withdrawing the bag filter from the tubesheet as the prong is forcibly withdrawn.

4. The tool as defined in claim 3 wherein said control means for activating said power cylinder comprises a manually operated control valve.

5. A portable tool for extracting dust collector bag filters in baghouses of the type comprising a plurality of bag filters collectively mounted in a tubesheet, the bag filters having generally circular peripheries and the tubesheet comprising a planar floor and a plurality of spaced apart orifices in said floor in which said filters are mounted, said tool comprising:

an elongated, vertically upright frame adapted to be generally perpendicularly oriented with respect to said baghouse tubesheet, the frame comprising a top;

a handle coupled to said frame at the top thereof for enabling manual manipulation of said tool by a workman;

an extractor extending from said frame for engaging a bag filter to be removed by first penetrating the tubesheet mounting orifice in which said bag filter is mounted adjacent the circular periphery of the filter to be removed below the plane of the tubesheet floor, and thereafter captivating a portion of said bag periphery when said extractor is withdrawn;

a foot projecting downwardly from said frame that forcibly engages the tubesheet floor adjacent a bag filter to be withdrawn and the tubesheet hole in which it is received;

a power cylinder for forcibly, axially displacing said foot towards the tubesheet floor whereby said extractor is forcibly displaced upwardly and removed from said tubesheet orifice and simultaneously a bag filter is forcibly removed from said tubesheet by said extractor; and, control means mounted proximate said handle for selectively activating said power cylinder to displace said foot.

6. The tool as defined in claim 5 wherein said frame comprises a double acting pneumatic power cylinder, and said handle is secured to said cylinder.

7. The tool as defined in claim 5 wherein said extractor comprises a sharp, prong adapted to forcibly penetrate the tubesheet mounting orifice and the bag filter therein, the prong comprising a rigid barb for captivating and withdrawing the bag filter from the tubesheet as the prong is forcibly withdrawn.

8. The tool as defined in claim 7 wherein said control means for activating said power cylinder comprises a manually operated control valve.

9. A portable tool for extracting dust collector bag filters in baghouses of the type comprising a plurality of bag filters collectively mounted in a tubesheet, the bag filters having generally circular peripheries and the tubesheet comprising a planar floor and a plurality of spaced apart orifices in said floor in which said filters are mounted, said tool comprising:

an elongated, vertically upright frame adapted to be generally perpendicularly oriented with respect to said baghouse tubesheet, the frame comprising a top;

a handle coupled to said frame at the top thereof for enabling manual manipulation of said tool by a workman;

a downwardly extending extractor for engaging a bag filter to be removed by first penetrating the tubesheet mounting orifice in which said bag filter is mounted adjacent the circular periphery of the filter to be removed below the plane of the tubesheet floor, and thereafter captivating a portion of said bag periphery after said extractor is inserted;

a foot projecting downwardly from said frame that engages the tubesheet floor adjacent a bag filter and the hole in which it is received;

a power cylinder for forcibly, axially withdrawing said extractor from said tubesheet orifice to simultaneously forcibly remove a bag filter from said tubesheet captivated by said extractor; and, control means mounted proximate said handle for selectively activating said power cylinder.

10. The tool as defined in claim 9 wherein said frame comprises a double acting pneumatic power cylinder, and said handle is secured to said cylinder.

11. The tool as defined in claim 9 wherein said extractor comprises a sharp, prong adapted to forcibly penetrate the tubesheet mounting orifice and the bag filter therein, the prong comprising a rigid barb for captivating and withdrawing the bag filter from the tubesheet as the prong is forcibly withdrawn.

12. The tool as defined in claim 11 wherein said control means for activating said power cylinder comprises a manually operated control valve.

* * * * *